F. A. STEVENS.
SPECTACLE MOUNTING.
APPLICATION FILED JUNE 29, 1914.
1,145,711. Patented July 6, 1915.
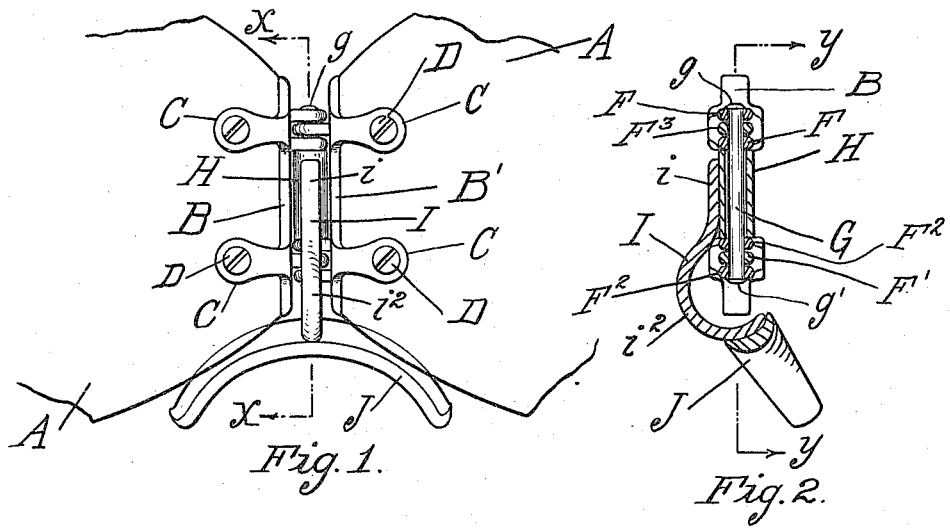
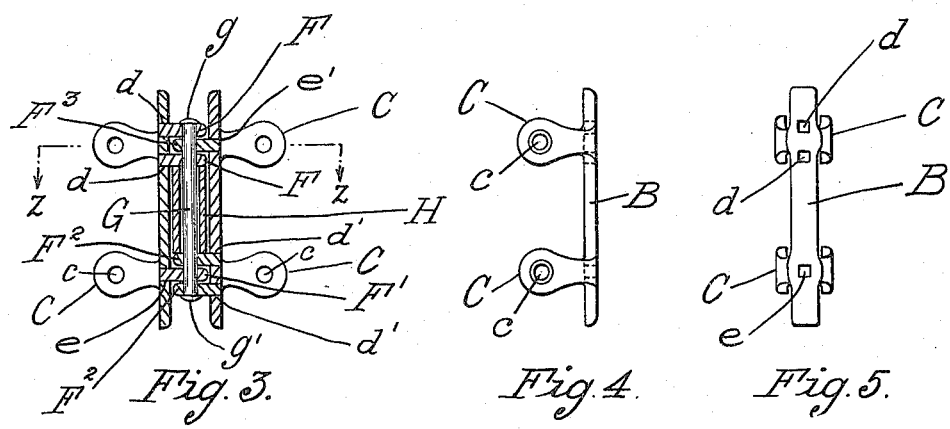
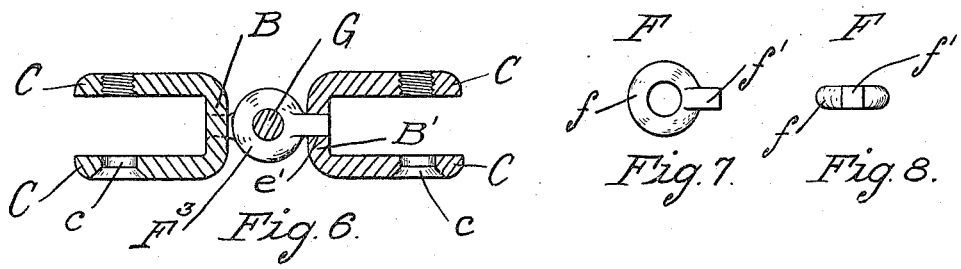
Witnesses.
Albert G. Piegenkowski
Freda C. Anderson
Inventor
Frederick A. Stevens
By Horatio E. Bellows
Attorney.

UNITED STATES PATENT OFFICE.

FREDERICK A. STEVENS, OF PROVIDENCE, RHODE ISLAND, ASSIGNOR TO STEVENS AND COMPANY, INCORPORATED, A CORPORATION OF RHODE ISLAND.

SPECTACLE-MOUNTING.

1,145,711.  Specification of Letters Patent.  Patented July 6, 1915.

Application filed June 29, 1914. Serial No. 847,837.

*To all whom it may concern:*

Be it known that I, FREDERICK A. STEVENS, a citizen of the United States, residing at Providence, in the county of Providence and State of Rhode Island, have invented certain new and useful Improvements in Spectacle-Mountings, of which the following is a specification.

My invention relates to goggles, shooting glasses and other spectacles of a similar type.

The essential objects of my invention are to afford a facile movement of the lenses relatively to each other and to the pivoting member; to afford adjustability of the nose rest in any direction; to prevent excessive rotary travel of the nose rest; to maintain the lenses comparatively tight and rigid relatively to each other without interfering with the free rotation of the nose rest; to facilitate the adjustability of the nose rest by the attachment of the bridge connection to the tube above one of the hinge portions; and to lessen the expense of construction and the amount of labor in assembling.

To the above ends essentially my invention consists in such parts and combinations of parts as fall within the scope of the appended claims.

In the accompanying drawings which form a part of this specification, Figure 1 is a front elevation of my novel mounting embodied in a pair of spectacles, portions of the lenses being broken away, Fig. 2, a section of the same on line $x, x$, of Fig. 1, Fig. 3, a section on line $y, y$, of Fig. 2, Figs. 4 and 5 detail views of a strap, Fig. 6, a section on line $z, z$, of Fig. 3, and Figs. 7 and 8 detail views of one of the rings.

Like reference characters indicate like parts throughout the views.

To the lenses A of a pair of glasses are applied straps B, B′, provided at their lateral edges with pairs of attaching lugs C having openings $c$ to receive the attaching screws D for engagement with the lenses. By suitable tools the straps are each provided with three square openings, two of the openings $d$ are located adjacent each other in the upper portion of the strap B between the lugs, and a third opening $e$, in the lower portion of the same between the lower lugs, all the openings being in alinement with each other. In the strap B′, the two openings $d'$ are located between the lower straps, and the opening $e'$, between the upper lugs, all as shown in Figs. 3 and 5. In the described openings are located hinge members similar to each other in shape and dimensions, one of which members, F is shown in Figs. 7 and 8. In detail it comprises a ring $f$ provided with a square radial projection $f'$. The projections $f'$ fit in the openings $d$ of the strap, wherein they may be more firmly held by solder if desired. One of the members F′ is engaged in the opening $e$; two other of the members F², in the openings $d'$; and a member F³ in the opening $e'$. By the described form of hinge connection an accurate location thereof may be obtained by mechanical means before soldering, and when the portion $f$ is of tubular rather than annular form, the necessity of sawing or burring is obviated.

A pivot pin G passes through the hinge members and has its ends riveted over forming upper and lower heads $g$ and $g'$ abutting against the outer members F and F² respectively. Surrounding the pin G is a sleeve or tube H having its upper end abutting against the lower of the two hinge members F, and with its lower end in contact with the upper of the two hinge members F². To the tube is attached an upright arm I whose upper portion $i$ is disposed longitudinally of the tube and is fixed thereto preferably by solder. The lower portion of the arm is bent to form a loop $i^2$, the loop extending first outwardly and downwardly from the tube, and then inwardly. The free end of the loop is soldered to the middle of an arcuate shaped nose rest J.

In operation the nose rest J is supported by the bridge of the nose, and the arm I which supports the tube H is by virtue of the loop $i^2$ capable of adjustment whereby the lenses may be raised or lowered or laterally adjusted relatively to the nose rest. The lenses have pivotal motion relatively to the arm I, and relatively to each other, although the frictional engagement of the hinge members F upon the pin G is considerably greater than the engagement of the pin with the tube H, so that while normally the lenses are comparatively stationary with relation to each other, they are still capable of movement relatively to each other. Excessive travel of the nose rest relatively to the lenses is prevented by the portion $i$ of the arm which forms a stop when by swinging the arm comes in contact with either strap. By riveting the heads g and g' to a greater or less degree the relative tightness of the pivot members may be changed without affecting the tightness or looseness of the sleeve H upon the pivot pin G.

What I claim is,—

1. The combination with spectacle lenses, of a nose rest, an arm upon the nose rest, a tube fixed to the arm, a pivot pin loosely mounted in the tube, and straps engaging the lenses attached to the pin.

2. The combination with spectacle lenses, of a nose rest, an arm upon the nose rest, a tube fixed to the arm, a pivot pin loosely mounted in the tube, and straps engaging the lenses attached to the pin above and below the sleeve.

3. The combination with spectacle lenses, of a nose rest, an upright arm upon the nose rest provided with a loop, a tube upon the arm above the loop, a pin pivotally mounted in the tube, and straps engaging the lenses attached to the pin.

4. The combination with spectacle lenses, of a nose rest, a vertically disposed tube, an arm upon the nose rest having its upper portion fixed to the exterior of the tube longitudinally thereof, a pin loosely mounted in the tube, and straps engaging the lenses attached to the pin and movable against the arm.

5. The combination with spectacle lenses, of a nose rest, an arm upon the nost rest, a tube fixed to the arm, a pin loose in the tube, straps upon the lenses, and hinge members upon the straps mounted upon the pin above and below the tube.

6. The combination with spectacle lenses, of a nose rest, an arm upon the nose rest, a tube fixed to the arm, a pin loose in the tube, straps upon the lenses, and hinge members upon the straps pivotally engaging the pin above and below the tube.

7. The combination with spectacle lenses, of a nose rest, an arm upon the nose rest, a tube upon the arm, a pin loose in the tube, straps upon the lenses parellel with the post and adjacent thereto, each strap being provided with two holes near one end and one hole near the other end in alinement with each other, said holes being respectively located beyond the ends of the tube, and hinge members comprising circular body portions embracing the pin, and radial projections seated in the openings in the straps.

8. The combination with spectacle lenses, of a nose rest, an arm upon the nose rest, a tube fixed to the arm, a pin loose in the tube, straps upon the lenses, hinge members upon the straps mounted upon the pin above and below the tube, and heads upon the ends of the pin overlapping the hinge members.

9. A nose rest, an arm having a loop supported on said nose rest and having an upwardly extending portion, a tube fixed to said portion, a pivot pin loosely mounted in said tube and straps engaging the lenses and having overlapped portions loosely receiving said pivot pin.

10. A nose rest, an arm carried thereby, a tube fixed to said arm, straps engaging the lenses and having overlapped portions, and a pintle loosely mounted in said tube and received in said overlapped portions, said pivot pin being independent of the nose rest.

11. A nose rest, an arm having a loop portion attached to said nose rest permitting said arm to be adjusted to adjust the lenses relatively to the nose rest, a tube fixed to said arm, straps engageable with lenses and having overlapped portions, and a pivot pin loosely received in said tube and overlapped portions, said pivot pin being independent of said arm.

12. In combination with spectacle lenses, a hinge for connecting the lenses, a sleeve loosely surrounding the axis of the hinge, and an arm extending from the sleeve and carrying a nose rest.

In testimony whereof I have affixed my signature in presence of two witnesses.

FREDERICK A. STEVENS.

Witnesses:
EDW. H. ZIEGLER,
HORATIO E. BELLOWS.